US012400665B2

(12) United States Patent
Athias

(10) Patent No.: US 12,400,665 B2
(45) Date of Patent: *Aug. 26, 2025

(54) VERIFICATION OF USER IDENTITY FOR VOICE ENABLED DEVICES

(71) Applicant: Comcast Cable Communications, LLC, Philadelphia, PA (US)

(72) Inventor: Franklyn Athias, Cherry Hill, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/733,622

(22) Filed: Apr. 29, 2022

(65) Prior Publication Data

US 2022/0328048 A1    Oct. 13, 2022

Related U.S. Application Data

(63) Continuation of application No. 15/879,238, filed on Jan. 24, 2018, now Pat. No. 11,355,126.

(51) Int. Cl.
*G10L 17/22* (2013.01)
*G06F 21/32* (2013.01)
(Continued)

(52) U.S. Cl.
CPC .............. *G10L 17/22* (2013.01); *G06F 21/32* (2013.01); *G10L 15/22* (2013.01); *G10L 15/26* (2013.01); *G10L 2015/223* (2013.01)

(58) Field of Classification Search
CPC ......... G10L 17/22; G10L 15/22; G10L 15/26; G10L 2015/223; G06F 21/32
See application file for complete search history.

(56) References Cited

U.S. PATENT DOCUMENTS 7,529,677 B1    5/2009  Wittenberg
8,082,448 B2   12/2011  Vandervort
(Continued)

FOREIGN PATENT DOCUMENTS

CA    2814353 A1    10/2013
EP    3489852 A1     5/2019

OTHER PUBLICATIONS

Lanza, User Authentication in a Voice Activated Computing System, 2017, Technical Disclosure Commons, whole document (Year: 2017).*

(Continued)

*Primary Examiner* — Sonia L Gay
(74) *Attorney, Agent, or Firm* — Ballard Spahr LLP

(57) ABSTRACT

Provided are methods and systems to verify user identity for voice enabled devices. A voice input can instruct a voice enabled device to perform a plurality of functions/services that require user verification. Primary user verification can be performed by associating voice characteristics of the voice input to a profile associated with a user/user device. A signal (e.g., a BLE beacon) can be sent to the user device that causes the user device to perform secondary user verification. The secondary user verification can be based on a biometric input, passcode verification, authenticated message reply, for example. Based on the secondary user verification, an operational command associated with the voice input can be executed.

20 Claims, 6 Drawing Sheets

(51) Int. Cl.
 *G10L 15/22* (2006.01)
 *G10L 15/26* (2006.01)

(56) References Cited

U.S. PATENT DOCUMENTS

| | | | |
|---|---|---|---|
| 8,543,834 | B1 | 9/2013 | Barra |
| 8,952,781 | B2 | 2/2015 | Al-Azem et al. |
| 8,959,360 | B1 * | 2/2015 | Barra .................... H04M 1/67 726/19 |
| 9,147,054 | B1 | 9/2015 | Beal et al. |
| 9,384,751 | B2 | 7/2016 | Venkatesha et al. |
| 9,391,985 | B2 | 7/2016 | Hefetz |
| 9,619,645 | B2 | 4/2017 | Bapat |
| 9,674,700 | B2 | 6/2017 | Archibald et al. |
| 9,898,250 | B1 | 2/2018 | Williams et al. |
| 10,122,712 | B2 | 11/2018 | Novack et al. |
| 10,911,446 | B2 | 2/2021 | Funane |
| 2006/0277043 | A1 | 12/2006 | Tomes et al. |
| 2009/0116703 | A1 | 5/2009 | Schultz |
| 2010/0097178 | A1 * | 4/2010 | Pisz .................... G07C 9/28 340/5.72 |
| 2010/0131272 | A1 | 5/2010 | Wu |
| 2012/0044089 | A1 * | 2/2012 | Yarnold ............. H04W 12/088 340/901 |
| 2014/0303983 | A1 * | 10/2014 | Bapat .................... G10L 15/20 704/273 |
| 2016/0371340 | A1 | 12/2016 | Waltermann et al. |
| 2017/0064003 | A1 | 3/2017 | Kubota |
| 2017/0169506 | A1 | 6/2017 | Wishne et al. |
| 2017/0351487 | A1 | 12/2017 | Aviles-Casco Vaquero et al. |
| 2018/0014189 | A1 | 1/2018 | Ellison et al. |
| 2018/0047394 | A1 | 2/2018 | Tian et al. |
| 2018/0218739 | A1 | 8/2018 | Park et al. |
| 2019/0149623 | A1 | 5/2019 | McPhee et al. |
| 2019/0189132 | A1 | 6/2019 | Viswanathan |

OTHER PUBLICATIONS

European Search Report issued in related application No. EP 19153285.2 mailed Jun. 6, 2019.
European Office Action issued in related application No. EP 19153285.2 mailed Feb. 9, 2021.
European Office Action issued in related application No. EP 19153285.2 mailed Jul. 2, 2021.

* cited by examiner

VERIFICATION OF USER IDENTITY FOR VOICE ENABLED DEVICES

CROSS-REFERENCE TO RELATED APPLICATIONS

This application is a continuation of application Ser. No. 15/879,238, filed Jan. 24, 2018, which is incorporated herein in its entirety.

BACKGROUND

A person can use their voice to request that a voice enabled device perform a variety of functions or services, such as make a purchase or unlock a security feature. It is possible that a voice used to make the request is not the actual voice of a person authorized to make such a request. For example, a tape recording of an authorized person's voice can be used for an unauthorized request to the voice enabled device. These and other shortcomings are addressed by the methods and systems described herein.

SUMMARY

It is to be understood that both the following general description and the following detailed description are exemplary and explanatory only and are not restrictive. Provided are methods and systems for verification of user identity for voice enabled devices. One or more voice inputs can be used to instruct a voice enabled device (e.g., smart device, wireless device, etc.) to perform a plurality of functions/services such as make a purchase, enable/disable security, control one or more devices, etc. Such functions/services can require user verification and/or authentication to ensure that the voice input is being provided by a specific individual. The voice enabled device can perform primary user verification and/or authentication via one or more techniques such as natural language processing, voice recognition, combinations thereof, and the like. For example, the voice enabled device can associate voice characteristics of the voice input to a profile associated with the individual. The voice enabled device can determine that the profile is associated with one or more user devices, such as a smartphone, a mobile device, or a laptop, for example. The one or more user devices can be associated with the individual suspected to be providing the voice input. The voice enabled device can send a signal (e.g., a BLE beacon, wireless signal, email, SMS message, etc.) that is received by the user device. The signal can cause the user device to perform secondary (or any other subsequent) user verification and/or authentication via one or more techniques such as obtaining a biometric input, passcode verification, authenticated message reply, combinations thereof, and the like. The user device can, based on the secondary (or any other subsequent) user verification and/or authentication, send a signal to the voice enabled device that indicates that the individual providing the voice input is verified as an authentic/authorized individual. The voice enabled device can then execute the voice input as a command (e.g., voice command). To execute the command, the voice enabled device can use speech recognition and/or natural language processing to decipher the voice input and convert the voice input into a device executable command.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, are examples and together with the description, serve to explain the principles of the methods and systems.

DETAILED DESCRIPTION

Figure 1:
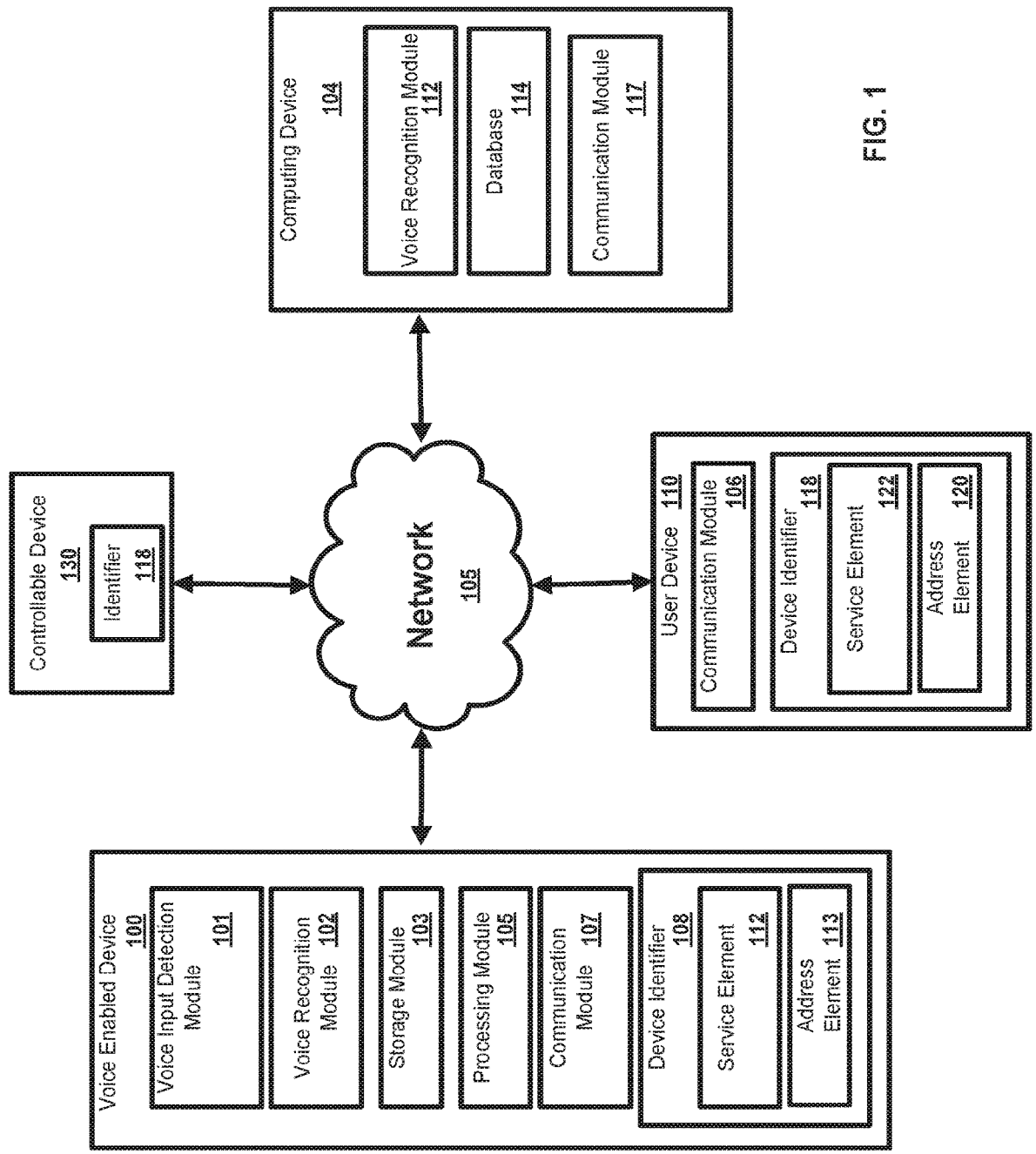
FIG. 1 is a block diagram of a system in which the present invention may operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods.

Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for verification of user identity for voice enabled devices. One or more voice inputs can be used to instruct a voice enabled device (e.g., smart device, wireless device, etc.) to perform a plurality of functions/services such as make a purchase, enable/disable security, control one or more devices, etc. . . . . Such functions/services can require user verification and/or authentication to ensure that the voice input is being provided by a specific individual. A voice enabled device can receive a voice input (e.g., voice command). For example, the voice enabled device can receive a voice input "open garage" that instructs the voice enabled device to communicate with another device, such as a garage door opener, and cause the device to execute the command. To determine that the voice input is from a particular user, the voice enabled device can perform primary user verification and/or authentication via one or more techniques such as natural language processing, voice recognition, combinations thereof, and the like. For example, the voice enabled device can associate voice characteristics of the voice input to a profile associated with the individual. Additionally, the voice enabled device can transmit data indicative of the voice input to a computing device (e.g., server, cloud-based device, etc.). The computing device can perform primary user verification and/or authentication via one or more techniques such as natural language processing, voice recognition, combinations thereof, and the like. For example, the computing device can associate voice characteristics of the voice input to a profile associated with the individual.

It can be determined that the profile is associated with one or more user devices, such as a smartphone, a mobile device, or a laptop for example. The one or more user devices can be associated with the individual suspected to be providing the voice input. The one or more user devices can be associated with a device identifier. The voice enabled device, based on a device identifier, can transmit a short-range signal (e.g., a BLE beacon, wireless signal) that is received by the user device. The signal can cause the user device to perform secondary (or any other subsequent) user verification and/or authentication via one or more techniques. For example, the user device can request an input from a user of the device to determine that the user is the individual suspected to be providing the voice input. The user device can request a biometric input (e.g., fingerprint, iris scan, facial recognition, etc.), a passcode, an authenticated message reply, combinations thereof, and the like from the user to determine that the user is the individual suspected to be providing the voice input. Additionally, the computing device, based on a device identifier, can transmit a long-range signal (e.g., a Wi-Fi signal, wireless signal, an Internet message, automated phone call, SMS message, etc.) that is received by the user device. The signal can cause the user device to perform secondary (or any other subsequent) user verification and/or authentication via one or more techniques. For example, the user device can request an input/submission from a user of the device to determine that the user is the individual suspected to be providing the voice input. The user device can request a biometric input (e.g., fingerprint, iris scan, facial recognition, etc.), a passcode, an authenticated message reply, combinations thereof, and the like from the user to determine that the user is the individual suspected to be providing the voice input.

The user device can, based on the secondary (or any other subsequent) user verification and/or authentication, send a signal to the voice enabled device that indicates that the individual providing the voice input is verified as an authentic/authorized individual. The user device can transmit a short-range signal (e.g., a BLE beacon, wireless signal) to the voice enabled device that indicates that the individual providing the voice input is verified as an authentic/authorized individual. Additionally, the user device can, based on the secondary (or any other subsequent) user verification and/or authentication, send a signal to the computing device that indicates that the individual providing the voice input is verified as an authentic/authorized individual. The user device can transmit a long-range signal (e.g., a Wi-Fi signal, wireless signal, an Internet message, automated phone call, SMS message, etc.) to the computing device that indicates that the individual providing the voice input is verified as an authentic/authorized individual. The computing device, based on the signal received from the user device, can send a signal to the voice enabled device that indicates that the individual providing the voice input is verified as an authentic/authorized individual. The computing device can transmit a long-range signal (e.g., a Wi-Fi signal, wireless signal, an Internet message, automated phone call, SMS message, etc.) to the voice enabled device that indicates that the individual providing the voice input is verified as an authentic/authorized individual.

The voice enabled device, based on the indication that the individual providing the voice input is verified as an authentic/authorized individual, can execute the voice input. To execute the command, the voice enabled device can use speech recognition and/or natural language processing to decipher the voice input and convert the voice input into a device executable command. Execution of the command by the voice enabled device can comprise the voice enabled device operating in accordance to/with the voice input. For example, execution of a voice input (e.g., voice command) "unlock" can comprise the voice enabled device transitioning from a locked/disabled state to an active/enabled state.

A system can be configured to provide services such as user identity verification services for voice enabled devices. FIG. 1 illustrates various aspects of an exemplary environment in which the present methods and systems can operate. The present disclosure is relevant to systems and methods for providing services to a device, for example, a voice enabled device such as a smart speaker, system control device, user device, communications terminal, wireless device, and the like. In an aspect, one or more network devices can be configured to provide various services such as user identity verification and authentication services to one or more devices, such as voice enabled devices and/or devices controlled by voice enabled devices. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

An example environment can comprise a voice enabled device 100 (e.g., a smart speaker, a system control device, a user device, a communications terminal, a wireless device, etc.). The voice enabled device 100 can be in communication with a network such as a network 105. The network 105 can be a network such as the Internet, a wide area network, a local area network, a cellular network, a satellite network, and the like. Various forms of communications can occur via the network 105. The network 105 can comprise wired and wireless communications and communication techniques.

The voice enabled device 100 can be associated with a device identifier 108. As an example, the device identifier 108 can be any identifier, token, character, string, or the like, for differentiating one voice enabled device from another voice enabled device. The device identifier 108 can identify voice enabled device 100 as belonging to a particular class of voice enabled devices. As a further example, the device identifier 108 can comprise information relating to the voice enabled device 100 such as a manufacturer, a model or type of device, a service provider associated with the voice enabled device 100, a state of the voice enabled device 100, a locator, and/or a label or classifier. Other information can be represented by the device identifier 108.

The device identifier 108 can comprise an address element 113 and a service element 112. The address element 113 can comprise or provide an internet protocol address, a network address, a media access control (MAC) address, an Internet address, or the like. For example, the address element 113 can be relied upon to establish a communication session between the voice enabled device 100 and a user device 110, a computing device 104, or other devices and/or networks. The address element 110 can be used as an identifier or locator of the voice enabled device 100. The address element 113 can be persistent for a particular network.

The service element 112 can comprise an identification of a service provider associated with the voice enabled device 100 and/or with the class of voice enabled device 100. The class of the voice enabled device 100 can be related to a type of device, capability of device, type of service being provided, and/or a level of service (e.g., business class, service tier, service package, etc.). For example, the service element 112 can comprise information relating to or provided by a communication service provider (e.g., Internet service provider) that is providing or enabling data flow such as communication services to the voice enabled device 100. The service element 112 can comprise information relating to a preferred service provider for one or more particular services relating to the voice enabled device 100. In an aspect, the address element 113 can be used to identify or retrieve data from the service element 112, or vice versa. One or more of the address element 113 and the service element 112 can be stored remotely from the voice enabled device 100 and retrieved by one or more devices such as the voice enabled device 100, the user device 110, and/or and the computing device 104, for example. Other information can be represented by the service element 112.

The voice enabled device 100 can comprise a voice input detection module 101 for detecting an audible input, such as a voice input. For example, the voice input detection module 101 can detect a user speaking near the voice enabled device 100 and the like. The voice input detection module 101 may include one or more a microphones, speakers, combinations thereof, and the like. The one or more a microphones, speakers, combinations thereof, and the like can receive the voice input from the user, and provide the voice input to a voice recognition module 102.

To control the one or more functions/services associated with the voice enabled device 100, the voice recognition module 102 can process the voice input. The voice recognition module 102 can perform speech-to-text operations that translate spoken words (e.g., voice input) into text, other characters, or commands. The voice recognition module 102 can apply one or more voice recognition algorithms to the voice input to extract a word or words (e.g., phrase). The voice recognition module 102 can be configured to convert the word or words to text and compare the text to a list of words stored in storage module 103. The voice enabled device 100 can associate/map the text to one or more operational commands stored in the storage module 103. As such, the voice enabled device 100 can determine operational commands from the voice input. The operational commands can be used to control one or more functions/services associated with the voice enabled device 100. The operational commands can be used to control one or more controllable devices (e.g., controllable device 117) in communication with the voice enabled device 100. The voice enabled device 100 can transmit one or more operational commands to one or more controllable devices after the voice input in verified and/or authenticated as being associated with a particular individual. For example, the voice enabled device 100 can transmit one or more operational commands to one or more controllable devices after the voice input in verified and/or authenticated as being associated with the individual suspected to be providing the voice input.

To verify and/or authenticate the voice input as being associated with the individual suspected to be providing the voice input, the voice recognition module 102 can process the voice input. The voice recognition module 102 can process the voice input by analyzing one or more voice characteristics associated with the voice input. Voice characteristics can comprise frequency, duration, decibel level, amplitude, tone, inflection, rate of speech, volume of speech, specific phrases and/or any or such characteristic associated with a voice input. The voice recognition module 102 can identify and store (e.g., via storage module 103) voice characteristics. For example, the voice recognition module 102 can identify and store voice characteristics whenever the voice enabled device 100 is in a "learn" or "discovery" mode, during an initial setup of the voice enabled device 100, based to repeated use of the voice enabled device 100, combinations thereof, and the like. Voice characteristics can be combined and together can represent a voice print. A voice print can be associated with a particular user and stored as a profile (e.g., user profile). Therefore, to verify and/or authenticate the voice input as being associated with the individual suspected to be providing the voice input, the voice enabled device 100 can determine, based on one or more voice characteristics, a voice print. The voice enabled device 100 can compare the voice print to one or more stored voice prints (e.g., voice prints stored as profiles). The voice enabled device 100 can determine that the voice print matches a stored voice print and is thus associated with a profile. The profile can be associated with one or more user devices, such as the user device 110.

The user device 110 can be an electronic device such as a computer, a smartphone, a mobile device, a laptop, a tablet, or any other device capable of communicating with the voice enabled device 100 or any other device in communication with the network 105. The user device 102 can comprise a communication module 106 for providing an interface to a user to interact with other devices, such as the voice enabled device 100 and/or the computing device 104. The communication module 106 can be any interface for presenting and/or receiving information to/from the user, such as an input (e.g., biometric input, passcode, authenticated message, combinations thereof, and the like). An example interface can be a fingerprint scanner, iris scanner, camera configured for facial recognition, keyboard, and/or a communication interface such as a web browser (e.g., Internet Explorer, Mozilla Firefox, Google Chrome, Safari, or the like). Other software, hardware, and/or interfaces can be used to provide communication between the user and one or more of the user device 110, the voice enabled device 100, the computing device 104, or any other device. As an example, the communication module 106 can request or query various files from a local source and/or a remote source. As a further example, the communication element 106 can transmit data to a local or remote device such as the computing device 104.

The user device 110 can be associated with a device identifier 118. As an example, the device identifier 118 can be any identifier, token, character, string, or the like, for differentiating one user or user device (e.g., user device 110) from another user or user device. The device identifier 118 can identify a user or user device as belonging to a particular class of users or user devices. As a further example, the device identifier 118 can comprise information relating to the user device such as a manufacturer, a model or type of device, a service provider associated with the user device 110, a state of the user device 110, a locator, and/or a label or classifier. Other information can be represented by the device identifier 118.

The device identifier 118 can comprise an address element 120 and a service element 122. The address element 120 can comprise or provide an internet protocol address, a network address, a media access control (MAC) address, an Internet address, or the like. For example, the address element 120 can be relied upon to establish a communication session between the user device 110 and the voice enabled device 100, the computing device 104, or other devices and/or networks. The address element 120 can be used as an identifier or locator of the user device 110. The address element 120 can be persistent for a particular network.

The service element 122 can comprise an identification of a service provider associated with the user device 110 and/or with the class of user device 110. The class of the user device 110 can be related to a type of device, capability of device, type of service being provided, and/or a level of service (e.g., business class, service tier, service package, etc.). For example, the service element 122 can comprise information relating to or provided by a communication service provider (e.g., Internet service provider) that is providing or enabling data flow such as communication services to the user device 110. The service element 122 can comprise information relating to a preferred service provider for one or more particular services relating to the user device 110. In an aspect, the address element 120 can be used to identify or retrieve data from the service element 122, or vice versa. One or more of the address element 110 and the service element 112 can be stored remotely from the user device 110 and retrieved by one or more devices such as the user device 110, the voice enabled device 100, and/or and the computing device 104, for example. Other information can be represented by the service element 122.

To further verify and/or authenticate the voice input as being associated with an individual suspected to be providing the voice input, the voice enabled device 100 can establish a communication session with the user device 110 over a network 105 via a communication module 107. The communication module 107 can comprise a transceiver configured for communicating information using any suitable wireless protocol, for example Wi-Fi (IEEE 802.11), BLUETOOTH®, cellular, satellite, infrared, or any other suitable wireless standard. For example, the communication module 107 can communicate with the user device 110 via a short-range communication technique (e.g., BLUETOOTH®, near-field communication, infrared, and the like). For example, the voice enabled device 100, based on a device identifier, can transmit a short-range signal (e.g., a BLE beacon, wireless signal) that is received by the user device 110. The signal can cause the user device 110 to perform secondary (or any other subsequent) user verification and/or authentication via one or more techniques to determine that the voice input is in fact being provided by the individual suspected to be providing the voice input. For example, the user device 110 can request an input from a user of the user device 110 to determine that the user is the individual suspected to be providing the voice input. The user device 110 can request a biometric input (e.g., fingerprint, iris scan, facial recognition, etc.), a passcode, an authenticated message reply, combinations thereof, and the like from the user to determine that the user is the individual suspected to be providing the voice input.

To verify and/or authenticate the voice input as being associated with the individual suspected to be providing the voice input, the voice recognition module 102 may not process the voice input. Instead, after receiving the voice input, the voice enabled device 100 can establish a communication session with a computing device 104. The voice enabled device 100 can transmit data indicative of the voice input to a computing device 104. The voice enabled device 100 can transmit data indicative of the voice input to a computing device 104. The voice enabled device 100 can transmit data indicative of the voice input to a computing device 104 via a long-range communication technique (e.g., Internet, cellular, satellite, and the like).

The computing device 104 can be a server in communication with the voice enabled device 100, the user device 110, one or more controllable devices 117, and a database 114 for sending and receiving data therebetween. As an example, the database 114 can store a plurality of profiles comprising voice prints, voice characteristics, identifiers (e.g., device identifiers associated with one or more controllable devices). The voice enabled device 100 or any other device in communication with the computing device 104 can request and/or retrieve information from the database 114.

The computing device 104 can process the voice input. The computing device 104 can comprise a voice recognition module 112. The voice recognition module 112 can perform speech-to-text operations that translate spoken words (e.g., voice input) into text, other characters, or commands. The voice recognition module 112 can apply one or more voice recognition algorithms to the voice input to extract a word or words (e.g., phrase). The voice recognition module 112 can be configured to convert the word or words to text and compare the text to a list of words stored in database 114. The computing device 104 can associate/map the text to one or more operational commands stored in the database 114. As such, the computing device 104 can determine operational commands from the voice input. The operational commands can be used to control one or more functions/services associated with the voice enabled device 100. The operational commands can be used to control one or more controllable devices (e.g., controllable device 117) in communication with the network 105. The computing device 104 can transmit one or more operational commands to one or more controllable devices after the voice input in verified and/or authenticated as being associated with a particular individual. For example, the computing device 104 can transmit one or more operational commands to one or more controllable devices after the voice input in verified and/or authenticated as being associated with an individual suspected to be providing the voice input.

To verify and/or authenticate the voice input as being associated with the individual suspected to be providing the voice input, the voice recognition module 112 can process the voice input. The voice recognition module 112 can process the voice input (e.g., data indicative of the voice input) by analyzing one or more voice characteristics associated with the voice input. Voice characteristics can comprise frequency, duration, decibel level, amplitude, tone, inflection, rate of speech, volume of speech, specific phrases and/or any or such characteristic associated with a voice input. The voice recognition module 112 can identify and store (e.g., via database 114) voice characteristics. Voice characteristics can be combined and together can represent a voice print. A voice print can be associated with a particular user and stored as a profile (e.g., user profile). The voice print can be associated with a particular user and stored as a profile in database 114. To verify and/or authenticate the voice input as being associated with the individual suspected to be providing the voice input, the computing device 104 can determine, based on one or more voice characteristics, a voice print. The computing device 104 can compare the voice print to one or more stored voice prints (e.g., voice prints stored as profiles). The computing device 104 can determine that the voice print matches a stored voice print and is thus associated with a profile. The profile can be associated with one or more user devices, such as user device 110. The one or more user devices can be associated with a device identifier (e.g., device identifier 118). The one or more user devices can be a smartphone, a mobile device, a laptop, and the like associated with the individual suspected to be providing the voice input.

To further verify and/or authenticate the voice input as being associated with the individual suspected to be providing the voice input, the computing device 104 can establish a communication session with the user device 110 across the network 105 via a communication module 117. The communication module 117 can comprise a transceiver configured for communicating information using any suitable wireless protocol, for example Wi-Fi (IEEE 802.11), cellular, satellite, or any other suitable wireless standard. For example, the communication module 117 can communicate with the user device 110 via a long-range communication technique (e.g., Internet, cellular, satellite, and the like). For example, the computing device 104, based on a device identifier, can transmit a long-range signal (e.g., a Wi-Fi signal, wireless signal, an Internet message, automated phone call, SMS message, etc.) that is received by the user device 110. The signal can cause the user device 110 to perform secondary (or any other subsequent) user verification and/or authentication via one or more techniques to determine that the voice input is in fact being provided by the individual suspected to be providing the voice input. For example, the user device 110 can request an input from a user of the user device 110 to determine that the user is the individual suspected to be providing the voice input. The user device 110 can request a biometric input (e.g., fingerprint, iris scan, facial recognition, etc.), a passcode, an authenticated message reply, combinations thereof, and the like from the user to determine that the user is the individual suspected to be providing the voice input.

The user device 110, based on the secondary (or any other subsequent) user verification and/or authentication, can send a signal to the voice enabled device 100 that indicates that the individual providing the voice input is verified/authenticated as the individual suspected to be providing the voice input. The user device 110 can transmit a short-range signal (e.g., a BLE beacon, wireless signal) to the voice enabled device that indicates that the individual providing the voice input is verified/authenticated as the individual suspected to be providing the voice input. Additionally, the user device can, based on the secondary (or any other subsequent) user verification and/or authentication, send a signal to the computing device 104 that indicates that the individual providing the voice input is verified/authenticated as the individual suspected to be providing the voice input. The user device can transmit a long-range signal (e.g., a Wi-Fi signal, wireless signal, an Internet message, automated phone call, SMS message, etc.) to the computing device that indicates that the individual providing the voice input is verified/authenticated as the individual suspected to be providing the voice input. The computing device 104, based on the signal received from the user device, can send a signal to the voice enabled device 100 that indicates that the individual providing the voice input is verified/authenticated as the individual suspected to be providing the voice input. The computing device 104 can transmit a long-range signal (e.g., a Wi-Fi signal, wireless signal, an Internet message, automated phone call, SMS message, etc.) to the voice enabled device 100 that indicates that the individual providing the voice input is verified/authenticated as the individual suspected to be providing the voice input.

The voice enabled device 100, based on the indication that the individual providing the voice input is verified/authenticated as the individual suspected to be providing the voice input, can execute a command associated with the voice input. To execute the command, the voice enabled device 100 can use speech recognition and/or natural language processing to decipher the voice input and convert the voice input to a device executable command. Execution of the command by the voice enabled device 100 can comprise the voice enabled device 100 operating in accordance to/with the voice input. For example, execution of a voice input (e.g., voice command) "unlock" can comprise the voice enabled device transitioning from a locked/disabled state to an active/enabled state.

The voice enabled device 100, based on the indication that the individual providing the voice input is verified/authenticated as the individual suspected to be providing the voice input, can determine an operational command from the voice input and transmit the operational command to a controllable device 130. The controllable device 130 can execute the operational command. The voice enabled device 100 can use speech recognition and/or natural language processing to decipher the voice input and convert the voice input to a the operational command. The operational command can be a command executable by the controllable device 130. Execution of the operational command by controllable device 130 can comprise the controllable device 130 operating in accordance to/with the voice input. For example, execution of an operational command derived from a voice input "open garage" can comprise the controllable device 130 (e.g., a garage door opener) opening a garage door.

Figure 2:
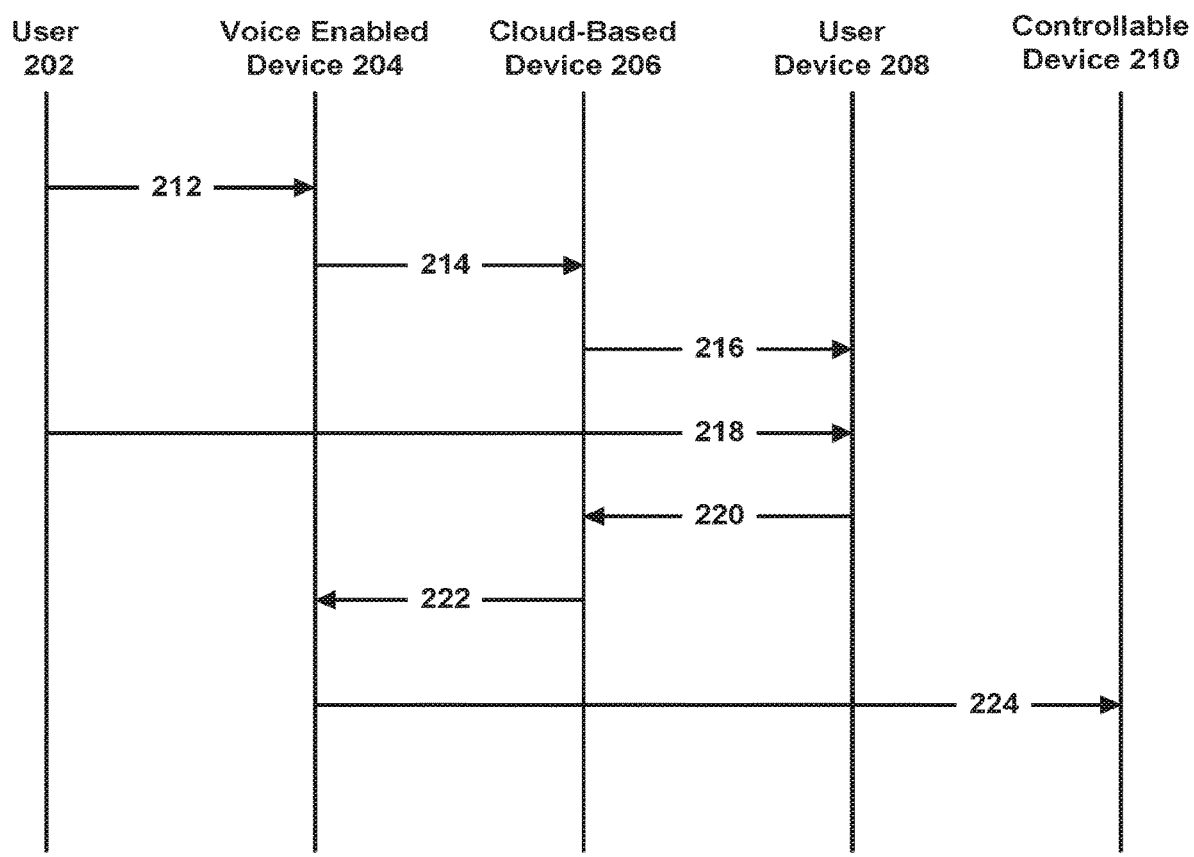
FIG. 2 is a diagram of an example process for verification of user identity for voice enabled devices.

FIG. 2 is a diagram of an example process for user identity verification for voice enabled devices. The process can comprise communication over a network between a user 202 and a plurality of devices, such as a voice enabled device 204, a cloud-based device 206, a user device 208, an a controllable device 210.

At 212, the user 202 can provide a voice input to the voice enabled device 204. To provide the voice input, the user 202 can speak a phrase that may be interpreted as a command for one or more devices, such as the voice enabled device 204 and the controllable device 210 for example. For example, the user 202 can speak the phrase (e.g., command) "open garage" that instructs the voice enabled device 204 to communicate with the controllable device 210 (e.g., a garage door opener) and cause the controllable device 210 device to execute the command provided by the voice input.

The voice enabled device 204 (e.g., voice enabled device 100) can be smart speaker, system control device, user device, communications terminal, wireless device, and the like, for example. The voice enabled device 204 can receive the voice input via one or more microphones configured with the voice enabled device. To determine and verify/authenticate the identity of the user 202 providing the voice input, the voice enabled device 204 can perform primary user verification and/or authentication via one or more techniques such as natural language processing, voice recognition, combinations thereof, and the like. For example, the voice enabled device 204 can associate voice characteristics of the voice input to a profile associated with the individual. Additionally, the voice enabled device 204 can communicate with the cloud-based device 206 to determine and/or verify/authenticate an identity of the user 202 providing the voice input.

At 214, the voice enabled device 204 can transmit data indicative of the voice input to a cloud-based device 206 (e.g., a server, the computing device 104, a cloud-based device, etc.). The cloud-based device 206 can determine one or more operational commands from the voice input. The one or more operational commands (e.g., "open garage") can control functions/services associated with one or more controllable devices such as the controllable device 210 (e.g., a garage door opening device). To determine the one or more operational commands, the cloud-based device 206 can perform speech-to-text operations that translate spoken words (e.g., the voice input) into text, other characters, or commands (e.g., operational commands). The cloud-based device 206 can apply one or more voice recognition algorithms to the voice input to extract a word or words (e.g., phrase). The cloud-based device 206 can be configured to convert the word or words to text and compare the text to a list of words stored in a database (e.g., database 114). The cloud-based device 206 can associate/map the text to one or more operational commands stored in the database. As such, the cloud-based device 206 can determine operational commands from the voice input. The cloud-based device 206 (and/or the voice enabled device 204) can transmit one or more operational commands to the controllable device 210 after the voice input in verified and/or authenticated as being associated with the user 202.

To verify and/or authenticate the voice input as being associated with the user 202, the cloud-based device 206 can process the voice input. The cloud-based device 206 can perform primary user verification and/or authentication via one or more techniques such as natural language processing, voice recognition, combinations thereof, and the like. For example, the cloud-based device 206 can associate voice characteristics of the voice input to a profile associated with the individual. Voice characteristics can comprise frequency, duration, decibel level, amplitude, tone, inflection, rate of speech, volume of speech, specific phrases and/or any or such characteristic associated with a voice input. The cloud-based device 206 can determine voice characteristics from the voice input. The voice characteristics determined from the voice input can collectively represent a voice print. The cloud-based device 206 can compare the voice print determined from the voice input to a plurality of voice prints stored as a plurality of profiles in a database (e.g., database 114). The cloud-based device 206 can determine a profile associated with a user 202 based on a match between the voice print determined from the voice input and a voice print associated with a profile. The cloud-based device 206 can determine that the profile associated with the user 202 is associated with one or more user devices, such as a smartphone, a mobile device, or a laptop for example. For example, the profile can comprise one or more device identifiers associated with the one or more user devices (e.g., a mobile phone belonging to the user 202). The cloud-based device 206 can determine that a device identifier associated with the user device 208 is associated with the profile associated with the user 202. To further verify and/or authenticate the voice input as being associated with the user 202, the cloud-based device 206 can communicate with the user device 208.

At 216, the cloud-based device 206 can transmit a signal to the user device 208. The signal can be a Wi-Fi signal, wireless signal, an Internet message, automated phone call, SMS message, a notification via an application, combinations thereof, and the like. The signal can cause the user device 208 to perform secondary (or any other subsequent) user verification to verify and/or authenticate the voice input as being associated with the user 202. For example, based on the signal, the user device 208 can request an input from a user 202.

At 218, the user 202 can provide an input to the user device 208. The input can be a biometric input (e.g., fingerprint, iris scan, facial recognition, etc.), a passcode, an authenticated message reply, combinations thereof, and the like. Based on the input, it can be determined that the voice input is associated with the user 202. For example, the user device 208 can request a fingerprint scan from the user 202. The user 202 can provide a finger to a fingerprint scanner configured on the user device 208. The user device 208 can scan the fingerprint and determine that the fingerprint is associated with the user 202. As another example, the input from the user 202 can be a reply to a text message (e.g., SMS message). The text message can be generated by the one or more of the voice enabled device 204, the cloud-based device 206, and the user device 208 in response to the primary verification/authentication that the voice input is associated with the user 202.

At 220, the user device 208, based on the secondary (or any other subsequent) user verification and/or authentication, can send a signal to the cloud-based device 206 that indicates that the individual providing the voice input is verified/authenticated as the user 202. The user device can transmit a long-range signal (e.g., a Wi-Fi signal, wireless signal, an Internet message, automated phone call, SMS message, etc.) to the cloud-based device 206 that indicates that the individual providing the voice input is verified/authenticated as the user 202.

At 222, the cloud-based device 206, based on the signal received from the user device 208, can send a signal to the voice enabled device 204 that indicates that the individual providing the voice input is verified/authenticated as the user 202. The cloud-based device 206 can transmit a long-range signal (e.g., a Wi-Fi signal, wireless signal, an Internet message, automated phone call, SMS message, etc.) to the voice enabled device 204 that indicates that the individual providing the voice input is verified/authenticated as the user 202.

The voice enabled device 204, based on the indication that the individual providing the voice input is verified/authenticated as the user 202, can transmit an operational command determined from the voice input to the controllable device 210. The controllable device 210 can execute the operational command. Execution of the operational command by controllable device 210 can comprise the controllable device 210 operating in accordance to/with the voice input. For example, execution of an operational command derived from a voice input "open garage" can comprise the controllable device 210 (e.g., a garage door opener) opening a garage door.

Figure 3:
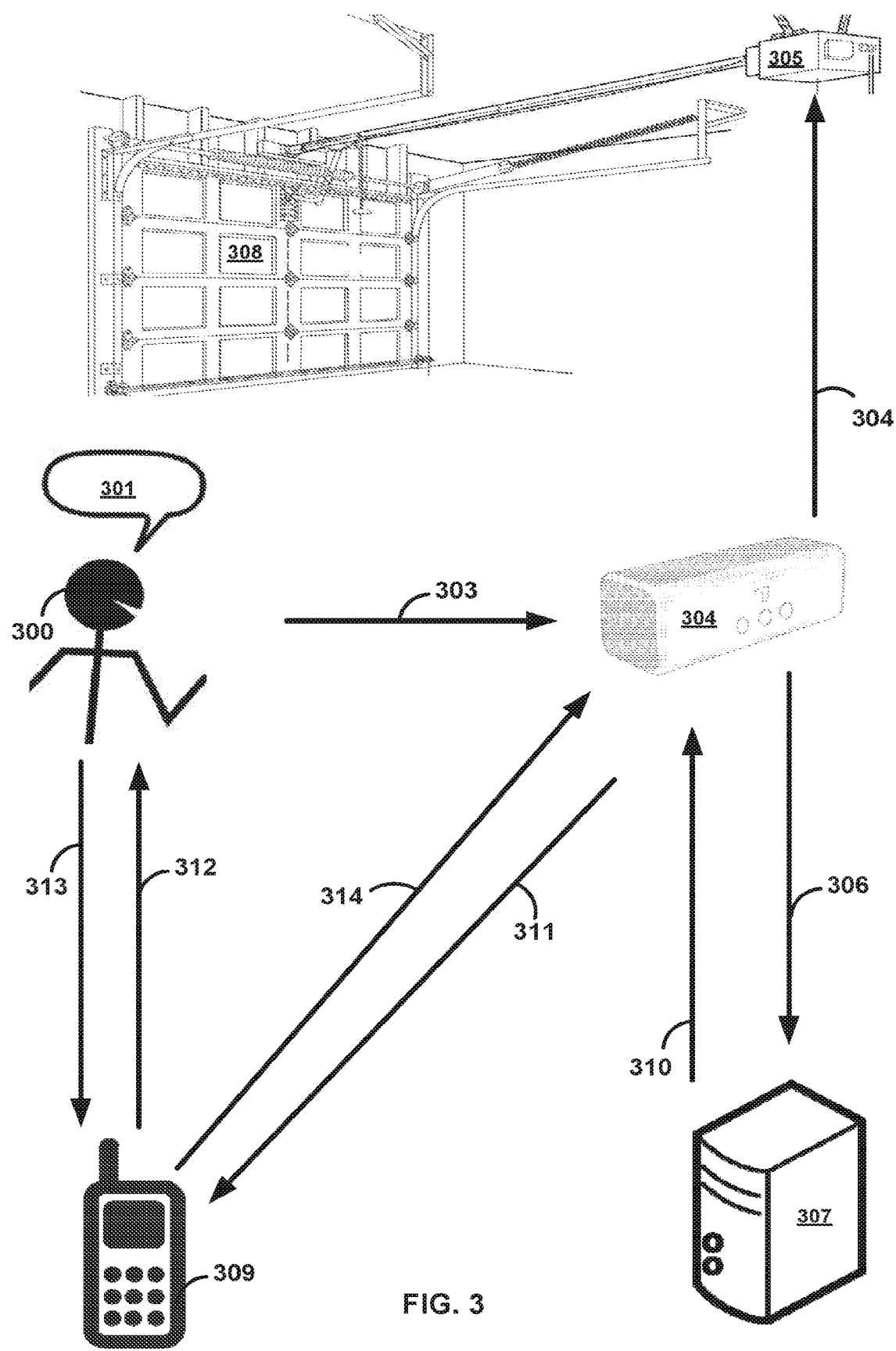
FIG. 3 is a diagram of an example process for verification of user identity for voice enabled devices.

FIG. 3 is a diagram of an example process for user identity verification for voice enabled devices. A user 300 can provide a voice input 301 (e.g., speak a phrase) that comprises an operational command associated with one or more controllable devices, such as the garage door opener 305. For example, the user 300 can speak the phrase "open garage" that instructs a voice enabled device 304 (e.g., smart speaker, system control device, user device, communications terminal, wireless device, voice enabled device 100, voice enabled device 204) to communicate with the garage door opener 305 and cause the garage door opener 305 (e.g., controllable device 130, controllable device 210) to execute the command (e.g., "open garage") provided by the voice input 301. Because opening a garage can provide access to a home, a level of security of needed to protect the home owner. As a security measure, an identity of the user 300 can be verified/authenticated prior to an execution of the operational command associated with the voice input 301.

To determine and verify/authenticate the identity of the user 300, at 306 the voice enabled device 304 can transmit data indicative of the voice input 301 to a server 307 (e.g., computing device 104, cloud-based device 206). The server 307 can determine the operational command "open garage" from the voice input 300. The operational command "open garage" can cause the garage door opener 305 to open the garage door 308. To determine the operational command, the server 307 can perform speech-to-text operations that translate spoken words (e.g., the voice input 301) into text, other characters, or commands (e.g., operational commands). The server 307 can apply one or more voice recognition algorithms to the voice input to extract a word or words (e.g., phrase). The cloud-server 307 can convert the word or words to text and compare the text to a list of words stored in a database. The server 307 can associate/map the text to one or more operational commands stored in the database. As such, the server 307 can determine operational commands from the voice input 301.

To verify and/or authenticate the voice input 301 as being associated with the user 300, the server 307 can process the voice input 301. The server 307 can associate voice characteristics of the voice input to a profile associated with the user 300. Voice characteristics can comprise frequency, duration, decibel level, amplitude, tone, inflection, rate of speech, volume of speech, specific phrases and/or any or such characteristic associated with a voice input (e.g., voice input 301). The server 307 can determine voice characteristics from the voice input 301. The voice characteristics determined from the voice input 301 can collectively represent a voice print. The server 307 can compare the voice print determined from the voice input 301 to a plurality of voice prints stored as a plurality of profiles in a database. The server 307 can determine a profile associated with a user 300 based on a match between the voice print determined from the voice input 301 and a voice print associated with a profile.

The server 307 can determine that the profile associated with the user 300 is associated with user device 309. The user device 309 is depicted as a smartphone, but it could be any other device such as a mobile device, or a laptop for example. The server 307 can determine that a device identifier associated with the user device 309 is associated with the profile associated with the user 300.

At 310, the server 307 can transmit information comprising the device identifier associated with the user device 309 and the determined operational command (e.g., "open garage") to the voice enabled device 304.

To further verify and/or authenticate the voice input 301 as being associated with the user 300, at 311 the voice enabled device 304 can communicate with the user device 309. The voice enabled device 304, based on a device identifier received from the server 307, can transmit a short-range signal (e.g., a BLE beacon, wireless signal) that is received by the user device 309.

The signal can cause the user device 309 to perform secondary (or any other subsequent) user verification to verify and/or authenticate the voice input 301 as being associated with the user 300. At 312, the user device 309 can request an input from the user 300. The input can be a biometric input (e.g., fingerprint, iris scan, facial recognition, etc.), a passcode, an authenticated message reply, combinations thereof, and the like.

At 313, the user 300 can provide an input to the user device 309. For example, the user device 309 can request a fingerprint scan from the user 300. The user 300 can provide a finger to a fingerprint scanner configured on the user device 309. The user device 309 can scan the fingerprint and determine that the fingerprint is associated with the user 300. As another example, the input from the user 300 can be a reply to a text message (e.g., SMS message). The text message can be generated by the one or more of the voice enabled device 304, the server 307, and the user device 309 in response to the primary verification/authentication that the voice input 301 is associated with the user 300. Based on the input, it can be determined that the voice input 301 is associated with the user 300.

At 314, the user device 309, based on the secondary (or any other subsequent) user verification and/or authentication, can transmit a short-range signal (e.g., a BLE beacon, wireless signal) to the voice enabled device 304 that indicates that the voice input 301 is associated with the user 300.

At 315, the voice enabled device 304, based on the indication that the voice input 301 is associated with the user 300, can transmit the operational command (e.g., "open garage") determined from the voice input 301 to the garage door opener 305. The garage door opener 305 can execute the operational command and open the garage door 308.

Figure 4:
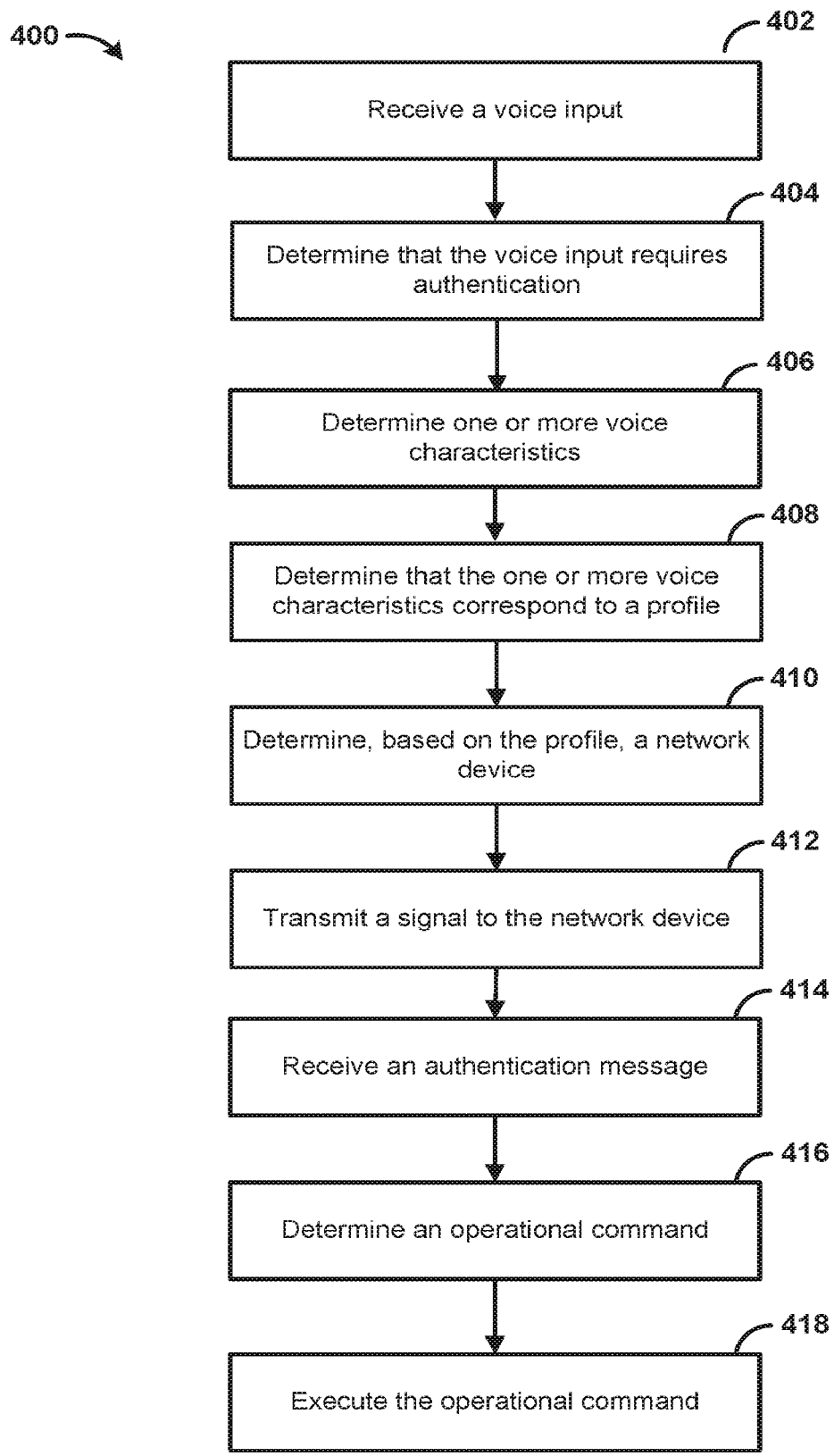
FIG. 4 is flowchart of an example method for user identity verification for voice enabled devices.

FIG. 4 is a flowchart of an example method for verification of user identity for voice enabled devices. At step 402 a voice enabled device can receive a voice input. The voice enabled device can receive the voice input via one or more microphones configured with the voice enabled device. The voice input can be a phrase with an inherent command associated with one or more devices such as "unlock door" spoken by a user.

At step 404, the voice enabled device can analyze the voice input and determine one or more voice characteristics associated with the voice input. Voice characteristics can comprise frequency, duration, decibel level, amplitude, tone, inflection, rate of speech, volume of speech, specific phrases and/or any or such characteristic associated with a voice input. The voice enabled device can identify and store voice characteristics. For example, the voice enabled device can identify and store voice characteristics whenever the voice enabled device is in a "learn" or "discovery" mode, during an initial setup of the voice enabled device, based to repeated use of the voice enabled device, combinations thereof, and the like. Voice characteristics can be combined and together can represent a voice print.

At step 406, the voice enabled device can determine that the one or more voice characteristics correspond to a profile. A voice print can be associated with a particular user and stored as a profile (e.g., user profile). The voice enabled device can determine, based on one or more voice characteristics determined from the voice input, a voice print. The voice enabled device can compare the voice print to one or more stored voice prints (e.g., voice prints stored as profiles). The voice enabled device can determine that the voice print matches a stored voice print and is thus associated with a profile. The profile can be associated with one or more network devices (e.g., user device 110, user device 208, user device 308, smartphone, mobile device, laptop, etc.).

Additionally, the voice enabled device can transmit data indicative of the voice input to a computing device (e.g., computing device 104, cloud-based device 206, server 307, etc.). The computing device can analyze the voice input and determine one or more voice characteristics associated with the voice input in the same manner described for the voice enabled device to analyze the voice input. As such, the computing device can store the profile that comprises the voice print and is associated with the one or more network devices.

At step 408, the voice enabled device can determine that a network device is associated with a user suspected to be providing the voice input. The voice enabled device can determine the network device based on the profile. For example, the profile can comprise one or more device identifiers (e.g., device identifier 118) that are associated with one or more devices (e.g., the network device, user device 110, user device 208, user device 309, smartphone, mobile device, laptop, etc.). The voice enabled device can determine that the network device is associated with a user suspected to be providing the voice input by identifying, from the profile, a device identifier associated with the network device. Additionally, the computing device can determine that the network device is associated with a user suspected to be providing the voice input by identifying, from the profile, a device identifier associated with the network device.

At step 410, the voice enabled device can transmit a signal to the network device. The voice enabled device, based on a device identifier determined from the profile, can transmit a short-range signal (e.g., a BLE beacon, wireless signal) that is received by the network device. The signal can cause the network device to perform secondary (or any other subsequent) user verification to verify and/or authenticate the voice input as being associated with the user. For example, the network device, based on the signal, can request an input from the user. The input can be a biometric input (e.g., fingerprint, iris scan, facial recognition, etc.), a passcode, an authenticated message reply, combinations thereof, and the like. For example, the network device can request a fingerprint scan from the user. The user can provide a finger to a fingerprint scanner configured with the network device. The network device can scan the fingerprint and determine that the fingerprint is associated with the user. As another example, the input from the user can be a reply to a text message (e.g., SMS message). The text message can be generated by the one or more of the voice enabled device, the computing device, the network device, or any other device in response to the primary verification/authentication that the voice input is associated with the user. Based on the input, it can be determined that the voice input is associated with the user and an authentication message can be sent to the voice enabled device.

At step 412, the voice enable device can receive the authentication message. The authentication message can be sent from the network device via a short-range signal (e.g., a BLE beacon, wireless signal) that is received by the voice enabled device. The authentication message can inform the voice enabled device that the voice input is associated with the user. Thus, the identity of the user providing the voice input can be verified.

At step 414, the voice enabled device can determine an operational command from the voice input. The voice enabled device can determine the operational command from the voice input after receiving the authentication message that informing the voice enabled device that the user is verified as providing the voice input. The voice enabled device can perform speech-to-text operations that translate the voice input into text, other characters, or commands. The voice enabled device can apply one or more voice recognition algorithms to the voice input to extract a word or words (e.g., phrase). The voice enabled device can convert the word or words to text and compare the text to a list of stored words. The voice enabled device can associate/map the text to one or more stored operational commands. As such, the voice enabled device can determine operational commands from the voice input. The operational commands can be used to control one or more functions/services associated with the voice enabled device and or any other device, such as a controllable device (e.g., controllable device 130, controllable device 210, garage door opener 305, etc.).

At step 416, the voice enabled device can execute the operational command derived from the voice input. Execution of the operational command can comprise the voice enabled device performing an action, function, and/or service in accordance to the operational command. For example, execution of an operational command "unlock" can comprise the voice enabled device transitioning from a locked/disabled state to an active/enabled state. Additionally, the voice enabled device can transmit one or more operational commands to one or more controllable devices (e.g., controllable device 130, controllable device 210, garage door opener 305, etc.). The one or more controllable devices can perform an action, function, and/or service in accordance to the operational command.

Figure 5:
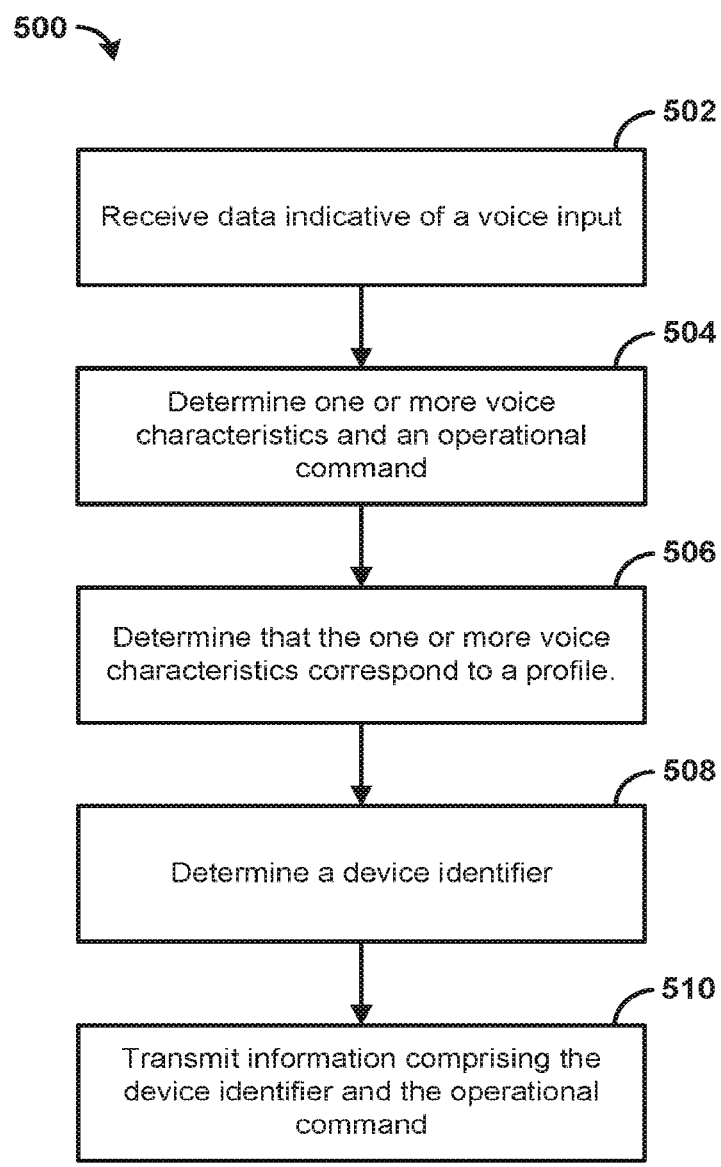
FIG. 5 is flowchart of an example method for user identity verification for voice enabled devices.

FIG. 5 is a flowchart of an example method for verification of user identity for voice enabled devices. At step 502 a computing device (e.g., computing device 104, cloud-based device 206, server 307, etc.) can receive data indicative of a voice input. The data indicative of the voice input can be received from a voice enabled device. The voice enabled device can transmit the data indicative of the voice input to the computing device to verify an identity of a user suspected to be providing the voice input to the voice enabled device. The voice enable device can receive the voice input via one or more speakers configured with the voice enabled device. The voice input can comprise one or more operational commands used to control the voice enabled device or any other device such as the controllable device 130, the controllable device 208, the garage door opener 305, and the like.

At step 504, the computing device can determine one or more voice characteristics and an operational command from the data indicative of the voice input. Voice characteristics can comprise frequency, duration, decibel level, amplitude, tone, inflection, rate of speech, volume of speech, specific phrases and/or any or such characteristic associated with a voice input. The computing device can analyze the data indicative of the voice input and extract voice characteristic information. The computing device can determine the operational command from the data indicative of the voice input. The computing device can perform speech-to-text operations that translate the data indicative of the voice input into text, other characters, or commands. The computing device can apply one or more voice recognition algorithms to the data indicative of the voice input to extract a word or words (e.g., phrase). The computing device can convert the word or words to text and compare the text to a list of stored words. The computing device can associate/map the text to one or more stored operational commands. As such, the computing device can determine the operational commands from the data indicative of the voice input. The operational command can be used to control one or more functions/services associated with a device, such as a controllable device (e.g., controllable device 130, controllable device 210, garage door opener 305, etc.).

At step 506, the computing device can determine that the one or more voice characteristics correspond to a profile. Voice characteristics can be combined and together can represent a voice print. A voice print can be associated with a particular user and stored as a profile (e.g., user profile). The computing device can determine, based on one or more voice characteristics determined from the data indicative of the voice input, a voice print. The computing device can compare the voice print to one or more stored voice prints (e.g., voice prints stored as profiles). The computing device can determine that the voice print matches a stored voice print and is thus associated with the profile.

At 508, the computing device can determine a device identifier. The computing device can determine the device identifier from the profile. For example, the profile can comprise one or more device identifiers (e.g., device identifier 118) that are associated with one or more devices (e.g., user device 110, user device 208, user device 309, smartphone, mobile device, laptop, etc.).

At 510, the computing device can transmit information comprising the device identifier and the operational command to the voice enabled device. For verification of the user identity, the voice enabled device, based on the information, can transmit an authentication request to a device associated with the device identifier. The authentication request can comprise one or more of an Internet-based message, an automated phone call, a text message, or a combination thereof. The user can be requested to respond to the authentication request. A satisfactory response to the authentication request can be used to verify an identity of the user suspected to have provided the voice input from which the data indicative of the voice input was derived. For example, the user can respond to a text message, provide a finger print to a finger print scanner, or provide any other response that may be deemed a satisfactory response to the authentication message.

Figure 6:
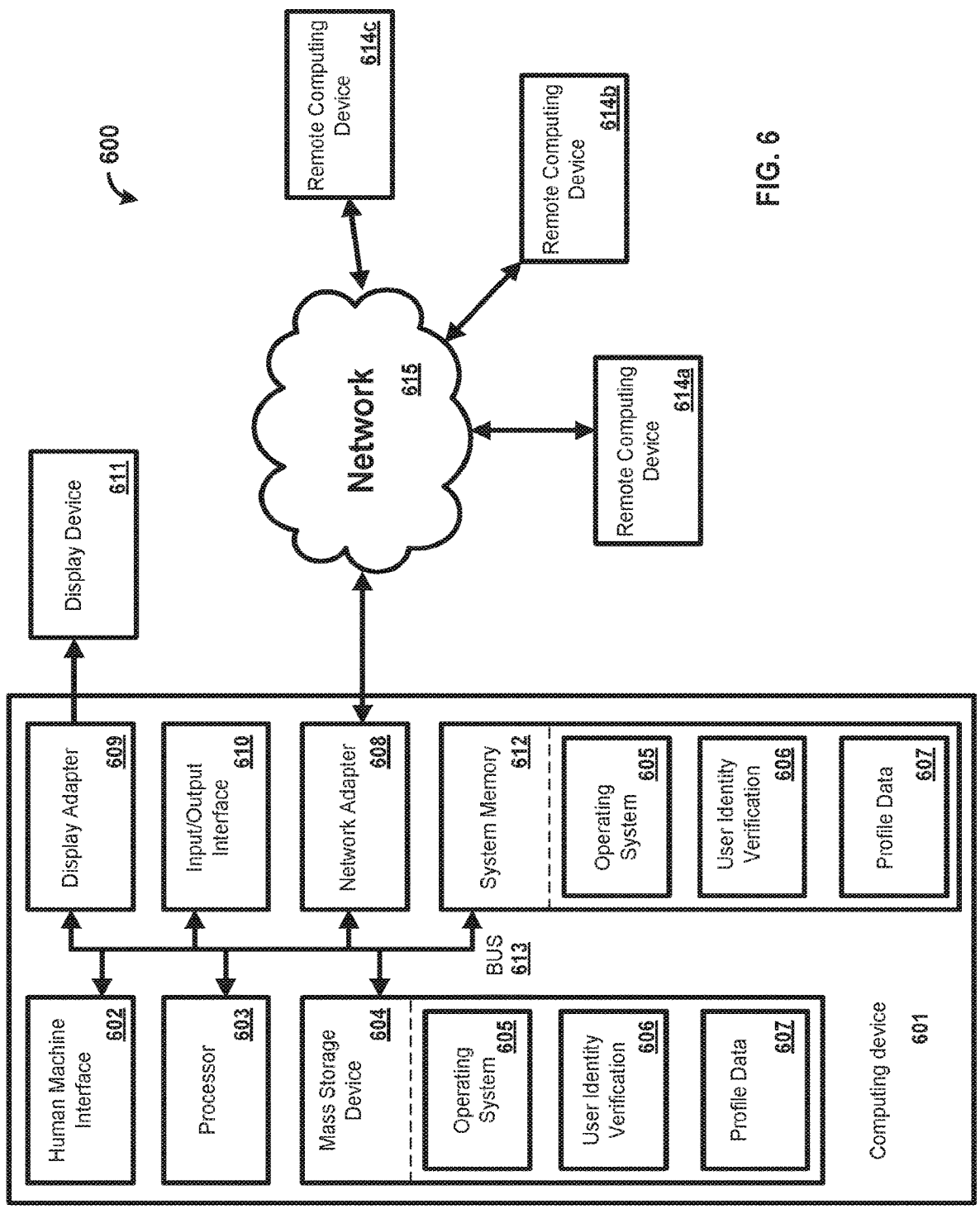
FIG. 6 is a block diagram of an example computing device in which the present methods and systems operate.

The methods and systems can be implemented on a computer 601 as illustrated in FIG. 6 and described below. By way of example, the voice enabled device 100, the computing device 104, the user device 110, the controllable device 130, the voice enabled device 204, the cloud-based device 206, the user device 208, the controllable device 210, the voice enabled device 304, the server 307, the user device 309, and the garage door opener 305 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the one or more processors 603, a mass storage device 604, an operating system 605, user identity verification software 606, profile data 607, a network adapter 608, the system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the profile data 607 and/or program modules such as the operating system 605 and the user identity verification software 606 that are immediately accessible to and/or are presently operated on by the one or more processors 603.

In another aspect, the computer 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the user identity verification software 606. Each of the operating system 605 and the user identity verification software 606 (or some combination thereof) can comprise elements of the programming and the user identity verification software 606. The profile data 607 can also be stored on the mass storage device 604. The profile data 607 can be stored in any of one or more databases known in the art. Examples of such databases comprise, DB2®, Microsoft® Access, Microsoft® SQL Server, Oracle®, MySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a fingerprint scanner, a facial recognition camera, an iris reader, a joystick, scanner, tactile input devices such as gloves, and other body coverings, and the like. These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, the display device 611 can also be connected to the system bus 613 via an interface, such as the display adapter 609. It is contemplated that the computer 601 can have more than one display adapter 609 and the computer 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computer 601 and a remote computing device 614a,b,c can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the user identity verification software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
based on an authentication requirement associated with a received voice input, determining, based on the received voice input, one or more voice characteristics;
determining, based on a profile associated with the one or more voice characteristics, a network device;
sending, to the network device, based on the authentication requirement, an authentication request; and
receiving, from the network device, based on the authentication request, an authentication message, wherein the authentication message indicates the received voice input is authorized.

2. The method of claim 1, further comprising:
converting at least a portion of the received voice input to text; and
matching the text to stored text, wherein the stored text is indicative of the authentication requirement.

3. The method of claim 1, wherein the determining the network device comprises:
determining, based on the one or more voice characteristics, a voice print; and
determining, based on comparing the voice print to one or more stored voice prints, that the voice print matches a stored voice print of the one or more stored voice prints, wherein the stored voice print is associated with the profile.

4. The method of claim 1, wherein determining the network device comprises determining, based on the profile, a device identifier associated with the network device.

5. The method of claim 1, wherein the authentication request comprises an identifier of a voice-enabled device, and wherein the identifier indicates an origin of the authentication request or is associated with a subset of devices that are associated with the voice-enabled device.

6. The method of claim 1, wherein the authentication request comprises one or more of an Internet-based message, an automated phone call, a text message, or an application-based notification.

7. The method of claim 1, wherein sending the authentication request to the network device causes the network device to:
request at least one biometric input; and
send, based on a determination that the at least one biometric input is associated with the profile, the authentication message to a voice-enabled device.

8. The method of claim 1, further comprising:
based on the authentication message, determining, based on the received voice input, an operational command; and
executing the operational command.

9. The method of claim 8, wherein determining the operational command comprises one or more of voice recognition or natural language processing.

10. A method comprising:
based on an authentication requirement associated with a received voice input, determining, based on the received voice input, one or more voice characteristics;

determining, based on a profile associated with the one or more voice characteristics, a network device;

sending, to the network device, based on a conversion of the received voice input to text, an authentication request; and receiving, from the network device, based on the authentication request, an authentication message, wherein the authentication message indicates the received voice input is authorized.

11. The method of claim 10, further comprising:

determining the conversion of the received voice input to the text by converting at least a portion of the received voice input to the text; and matching the text to stored text, wherein the stored text is indicative of the authentication requirement.

12. The method of claim 10, further comprising:

determining the conversion of the received voice input to the text by converting at least a portion of the received voice input to the text;

comparing the text to one or more stored operational commands; and determining that the text matches at least one of the one or more stored operational commands.

13. The method of claim 10, wherein the determining, based on the profile associated with the one or more voice characteristics, the network device comprises:

determining, based on the one or more voice characteristics, a voice print; and determining, based on comparing the voice print to one or more stored voice prints, that the voice print matches a stored voice print of the one or more stored voice prints, wherein the stored voice print is associated with the profile.

14. The method of claim 10, wherein determining the network device comprises determining, based on the profile, a device identifier associated with the network device.

15. The method of claim 10, wherein the authentication request comprises one or more of an Internet-based message, an automated phone call, a text message, or an application-based notification.

16. A method comprising:

based on an authentication requirement associated with a received voice input, determining, based on the received voice input, one or more voice characteristics;

determining, based on a profile associated with the one or more voice characteristics and a user device associated with the received voice input, a computing device;

sending, to the computing device, based on an operational command associated with the received voice input, an authentication request; and receiving, from the computing device, based on the authentication request, an authentication message, wherein the authentication message indicates the received voice input is authorized.

17. The method of claim 16, further comprising:

converting at least a portion of the received voice input to text; and matching the text to stored text, wherein the stored text is indicative of the authentication requirement.

18. The method of claim 16, further comprising:

based on the authentication message, determining, based on the received voice input, the operational command.

19. The method of claim 16, wherein the authentication request comprises an identifier of a voice-enabled device.

20. The method of claim 19, wherein the identifier indicates an origin of the authentication request or is associated with a subset of devices that are associated with the voice-enabled device.

* * * * *